United States Patent [19]

Clinch et al.

[11] 4,161,307
[45] Jul. 17, 1979

[54] VALVES FOR VEHICLE HEATING SYSTEMS

[75] Inventors: Colin W. F. Clinch, Basingstoke; David N. Harley, Bournemouth; John P. Palmer, Reading, all of England

[73] Assignee: ITW Limited, Basingstoke, England

[21] Appl. No.: 716,060

[22] Filed: Aug. 20, 1976

[30] Foreign Application Priority Data

Aug. 23, 1975 [GB] United Kingdom ............... 35112/75

[51] Int. Cl.² ............................................. F16K 5/10
[52] U.S. Cl. .................................. 251/206; 251/208; 251/301; 251/193
[58] Field of Search ............... 251/208, 301, 302, 303, 251/193, 326, 195, 206; 137/625.3

[56] References Cited

U.S. PATENT DOCUMENTS

| | | | |
|---|---|---|---|
| 786,603 | 4/1905 | Schenck | 251/302 |
| 903,354 | 11/1908 | Brown | 251/301 |
| 917,970 | 4/1909 | Smith et al. | 251/301 |
| 1,214,645 | 2/1917 | Boyden | 251/302 |
| 3,424,200 | 1/1969 | Marley et al. | 251/208 |
| 3,539,149 | 11/1970 | Se Breny | 251/193 |
| 3,779,428 | 12/1973 | Bauman | 251/303 |
| 3,987,819 | 10/1976 | Scheuermann | 251/208 |

FOREIGN PATENT DOCUMENTS

| | | | |
|---|---|---|---|
| 30949 | 8/1884 | Fed. Rep. of Germany | 251/301 |
| 1675521 | 2/1968 | Fed. Rep. of Germany | 251/301 |
| 1065429 | 5/1954 | France | 251/193 |
| 712789 | 5/1952 | United Kingdom | 251/302 |
| 961508 | 5/1963 | United Kingdom | 251/302 |

Primary Examiner—William R. Cline
Assistant Examiner—H. Jay Spiegel
Attorney, Agent, or Firm—Jack R. Halvorsen; Robert W. Beart

[57] ABSTRACT

A valve for regulating the flow of fluid in a motor vehicle heater system, the valve having a housing with co-axial inlet and outlet ports and a quadrantal closure member pivotally mounted in the housing for movement between open and closed positions, the closure member having an aperture coinciding with the outlet port when the closure member is in the open position and a thin flexible portion covering the outlet port when the valve member is in the closed position.

4 Claims, 8 Drawing Figures

VALVES FOR VEHICLE HEATING SYSTEMS

The present invention relates to metering valves for use in motor vehicle heating systems, to control the flow of a liquid heating medium.

There are at present two main types of heating system for the passenger compartment of a motor vehicle.

The first is an "air-blend" system, which uses a conventional radiator to heat a supply of air, the heat being drawn from the engine coolant. This supply of hot air is then mixed in proportion with cold air from the surroundings, and the resulting warm air is ducted to the interior of the vehicle. This system has the disadvantages that the accurate control of the temperature of air supplied to the passenger compartment is difficult, and the system is difficult to shut off completely when not required.

The second type of heating system utilises a radiator, through which coolant from the engine passes, and over which all the air to be delivered to the passenger compartment is ducted. The temperature of the air entering the passenger compartment is controlled by regulating the flow of hot coolant through the radiator, and it is for this purpose that the valve of the present invention is intended. Known valves for use in motor vehicle heating systems are complicated assemblies of many intricate parts, and do not always seal effectively when the pressure difference across the valve is small.

The valve of the present invention is simple to assemble and has the advantage that an effective seal is achieved when the valve is closed, even if the pressure difference between the inlet and outlet ports is small.

According to the present invention, a valve for regulating fluid in a motor vehicle heater system comprises a housing having an inlet port and an outlet port arranged coaxially, and a substantially planar closure member arranged to pivot from an open position to a closed position about an axis parallel to the axis of the ports, the closure member being formed with an aperture which communicates between the inlet port and the outlet port when the closure member is in the open position, and a thin flexible portion which covers the outlet port when the closure member is in the closed position.

Notches may be formed in the curved edge of the closure member at intervals, so that the flow area open to fluid varies continuously with the rotation of the closure member. By suitable choice of size and shape of the notches and the aperture, a linear flow/rotation relationship may be obtained for a constant pressure drop across the valve.

The flexible portion of the closure member has the advantage that it allows the valve to seal completely when the pressure difference between the inlet and outlet ports is small. Where the pressures on each side of the closure member differ substantially, the flexible portion may be stiffened locally where it covers the outlet port, to prevent excessive bulging of the flexible portion into the port area. This also ensures that the closure member will move easily from the closed position.

A valve according to the present invention will now be described with reference to the accompanying drawings, in which.

Figure 4:
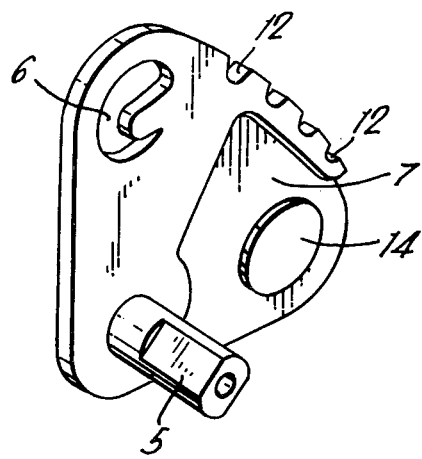
FIG. 4 is an enlarged perspective view of the closure member.
Figure 5:
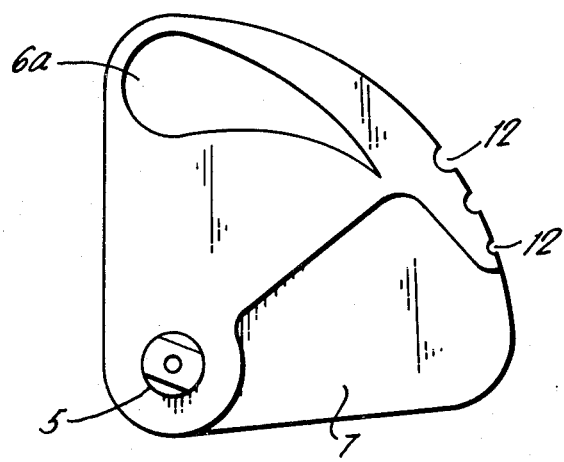
FIG. 5 shows an alternative closure member.
Figure 6:
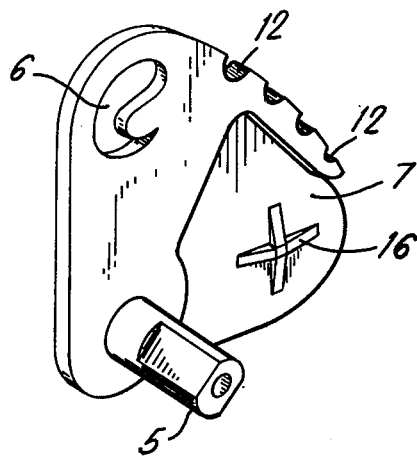
Figure 7:
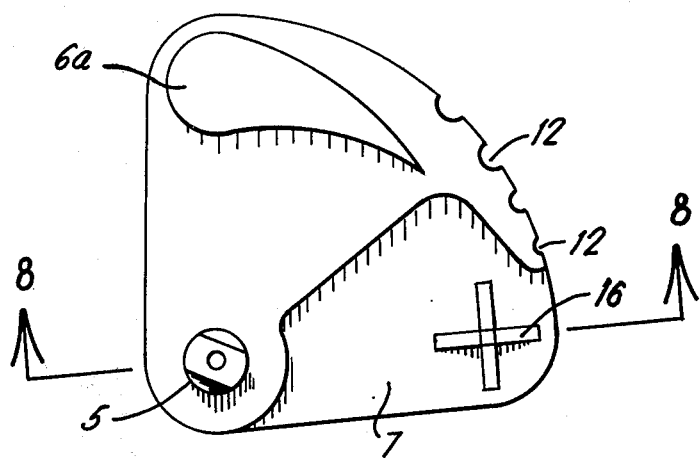
Figure 8:

FIGS. 6 and 7 are similar to FIGS. 4 and 5, respectively, except that localized stiffening ribs are utilized in the thinned portion; and FIG. 8 is a sectional view taken along lines 8—8 of FIG. 7.

Figure 1:
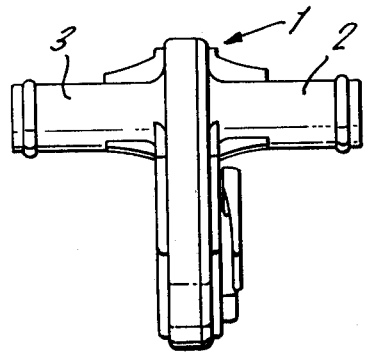
FIG. 1 is a side elevation of the valve.
Figure 2:
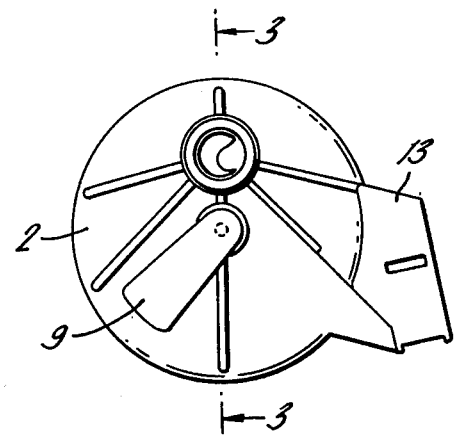
FIG. 2 is an end elevation of the valve, looking in the direction of flow of fluid through the valve.
Figure 3:
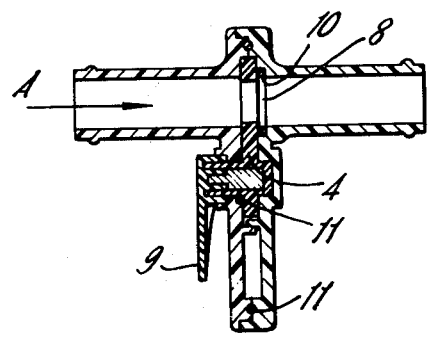
FIG. 3 is a section taken along the line 3—3 of FIG. 2.

Referring now to FIGS. 1 to 3 of the drawings, the valve 1 has a housing comprising two housing parts, an inlet part 2 and an outlet part 3. These parts are generally circular in the valve shown, but may take any convenient shape.

In FIG. 3, the disposition of the closure member 4 in the valve 1 is shown. The closure member 4 has a spindle 5, an aperture 6, both of which fall within a relatively thick rigid portion of closure member 4, and a thinned portion 7, shown more clearly in FIGS. 4 and 5.

The spindle 5 of the closure member is journalled on the housing parts such that the outlet port 8 is adjacent to and communicates with the aperture 6 when the valve is open, and is adjacent the thinned portion 7 of the closure member 4 when the valve is fully closed. This is achieved by rotation of the closure member about the spindle by means of the lever arm 9. As an alternative to a lever arm, a gear wheel or other means (not shown) may be employed to rotate the closure member.

The closure member 4 may be stiffened locally at that part of the thinned portion 7 which covers the outlet aperture when the valve is closed, to prevent the closure member from excessively bulging into the outlet port due to differential fluid pressure. One form of stiffening is shown at 14 in FIG. 4, namely, a thickened semi-rigid portion. Alternative configurations are possible for stiffening the thinned portion 7, for example a number of ribs 16, as seen in FIGS. 6 through 8, extending over the area of the closure member covering the outlet port when the valve is closed.

The fluid flows through the valve in the direction of the arrow A in FIG. 3. Leakage past the closure member is prevented by the seal 10 co-operating with the closure member and surrounding the outlet port. The inlet port is in communication at all times with the interior of the housing, which is thus full of fluid, the fluid being contained by the sealing rings 11 surrounding the spindle 5 and at the joint between the housing parts 1 and 2. There is thus no requirement for a fluid-tight seal at the inlet port, as the housing is maintained full of fluid.

The closure member 4 is adapted to allow a flow of liquid proportional to the deflection of the lever arm 9 from the closed position by the provision of the notches 12 and the aperture 6. The notches 12 and apertures 6 and 6a have portions thereof which fall on a radius that is less than and falls within the internal diametral extent of O-ring seal 10 and thereby permits fluid flow through the closure member at sealed notches and apertures. The areas and disposition of the notches and aperture are arranged so that a smooth increase in flow area is obtained as the closure member rotates from the closed position. Other shapes of aperture are of course possible, for example a single tapered substantially tear drop shaped aperture 6a, arranged as shown schematically in FIG. 5.

A mounting bracket 13 may be attached or integrally moulded with one or other of the housing parts 1 and 2, to support the valve.

All the parts of the valve may be moulded from plastics material, subject only to the requirement that the material is able to withstand the temperatures encountered without damage.

We claim:

1. A plastic valve for a motor vehicle heater system, comprising a housing, inlet and outlet ports formed coaxially in said housing, and a substantially planar closure member mounted in said housing for pivotal movement between an open position and a closed position about an axis parallel to said axis of said ports, said closure member being substantially quadrantal and extending in a plane perpendicular to said axis of said ports and having an aperture which communicates between said inlet and said outlet ports when the closure member is in said open position, said closure member having a predetermined substantially rigid thickness through a substantial portion of its area including that portion carrying said axis and forming said aperture and a thinner more flexible portion which covers said outlet port when the closure member is in said closed position, said flexible portion of said closure member being stiffened locally in the area of said thin flexible portion which covers said outlet port when said closure member is in the closed position with said flexible portion permitting flexing movement of the closure along the axis of said ports to insure sealing at low pressures between said ports and said closure member further having notches in its periphery, said notches traversing said outlet port as said closure member pivots from said open position to said closed position, with said notches acting as pressure relief means between said open and closed positions.

2. A valve according to claim 1, wherein the localized stiffening of said closure member comprises an area of increased thickness which is surrounded by a thin flexible portion.

3. A valve according to claim 1, wherein the localized stiffening of said flexible portion of said closure member comprises a number of ribs extending across the area of the closure member which covers said outlet port when said closure member is in said closed position.

4. A valve according to claim 1, wherein said closure member is an integral plastics moulding.

* * * * *